(12) United States Patent
Erb, Jr. et al.

(10) Patent No.: US 11,447,897 B2
(45) Date of Patent: Sep. 20, 2022

(54) PUNCTURE RESISTANT MATERIAL

(71) Applicant: DUPONT SAFETY & CONSTRUCTION, INC., Wilmington, DE (US)

(72) Inventors: David F. Erb, Jr., Readfield, ME (US); Eric A. Barter, Winthrop, ME (US)

(73) Assignee: DUPONT SAFETY & CONSTRUCTION, INC.

( * ) Notice: Subject to any disclaimer, the term of this patent is extended or adjusted under 35 U.S.C. 154(b) by 123 days.

(21) Appl. No.: 16/726,634

(22) Filed: Dec. 24, 2019

(65) Prior Publication Data

US 2020/0131676 A1 Apr. 30, 2020

Related U.S. Application Data

(60) Division of application No. 14/940,947, filed on Nov. 13, 2015, now Pat. No. 10,550,500, which is a (Continued)

(51) Int. Cl.
*D03D 27/12* (2006.01)
*B32B 5/02* (2006.01)
(Continued)

(52) U.S. Cl.
CPC ............. *D03D 27/12* (2013.01); *A43B 7/32* (2013.01); *A43B 13/023* (2013.01);
(Continued)

(58) Field of Classification Search
CPC ....... A43B 13/023; A43B 17/006; A43B 7/32; B32B 2262/0253; B32B 2262/0261; B32B 2307/558; B32B 2437/02; B32B 5/024; B32B 5/26; D03D 1/00; D04H 1/485; D06C 15/00; D10B 2321/022; D10B 2331/02; D10B 2501/043

See application file for complete search history.

(56) References Cited

U.S. PATENT DOCUMENTS 5,896,680 A 4/1999 Kim et al.
5,992,056 A 11/1999 Lohrmann
(Continued)

FOREIGN PATENT DOCUMENTS

WO WO 2010/083594 7/2010

OTHER PUBLICATIONS

Morin Brian, Weight Reduction and Cost Savings Using Hybrid Composites Containing High Modulus Polypropylene Fiber, Composites & Polygon 2009 Proceedings (Year: 2009).*

(Continued)

*Primary Examiner* — Arti Singh-Pandey

(57) ABSTRACT

A method for making puncture resistant material is made by aggressively twisting high modulus continuous filament polypropylene yarns and weaving the twisted yarns into a tight weave. Batting materials are placed adjacent the woven layer (which may comprise one or more individual woven layers) to form a stack and the stack is needlepunched to form a consolidated material. The material is heat treated and calendared and the finished product may be used in applications where puncture resistance is required, such as in a shoe insole material.

9 Claims, 1 Drawing Sheet

Related U.S. Application Data continuation of application No. PCT/US2014/039336, filed on May 23, 2014.

(60) Provisional application No. 61/827,326, filed on May 24, 2013.

(51) Int. Cl.
| | | |
|---|---|---|
| *A43B 7/32* | (2006.01) | |
| *A43B 17/00* | (2006.01) | |
| *A43B 13/02* | (2022.01) | |
| *B32B 5/26* | (2006.01) | |
| *D03D 1/00* | (2006.01) | |
| *D04H 1/485* | (2012.01) | |
| *D06C 15/00* | (2006.01) | |

(52) U.S. Cl.
CPC ............ *A43B 17/006* (2013.01); *B32B 5/024* (2013.01); *B32B 5/26* (2013.01); *D03D 1/00* (2013.01); *D04H 1/485* (2013.01); *D06C 15/00* (2013.01); *B32B 2262/0253* (2013.01); *B32B 2262/0261* (2013.01); *B32B 2307/558* (2013.01); *B32B 2437/02* (2013.01); *D10B 2321/022* (2013.01); *D10B 2331/02* (2013.01); *D10B 2501/043* (2013.01)

(56) References Cited

U.S. PATENT DOCUMENTS

| | | |
|---|---|---|
| 6,167,639 B1 | 1/2001 | Ventura |
| 7,074,483 B2 | 7/2006 | Morin |
| 7,445,834 B2 | 11/2008 | Morin |
| 2002/0074068 A1 | 6/2002 | Howland et al. |
| 2002/0124904 A1 | 9/2002 | Howland et al. |
| 2004/0116027 A1 | 6/2004 | Termonia et al. |
| 2004/0132368 A1* | 7/2004 | Price ................. B32B 7/08 |
| | | 442/247 |
| 2007/0173150 A1 | 7/2007 | Bhatnagar et al. |
| 2008/0222919 A1 | 9/2008 | Fenzi |
| 2012/0178323 A1* | 7/2012 | Rockenfeller ........ F41H 5/0478 |
| | | 442/86 |

OTHER PUBLICATIONS

Innegra™ S Fiber Product Information Sheet, 1993, p. 1.

* cited by examiner

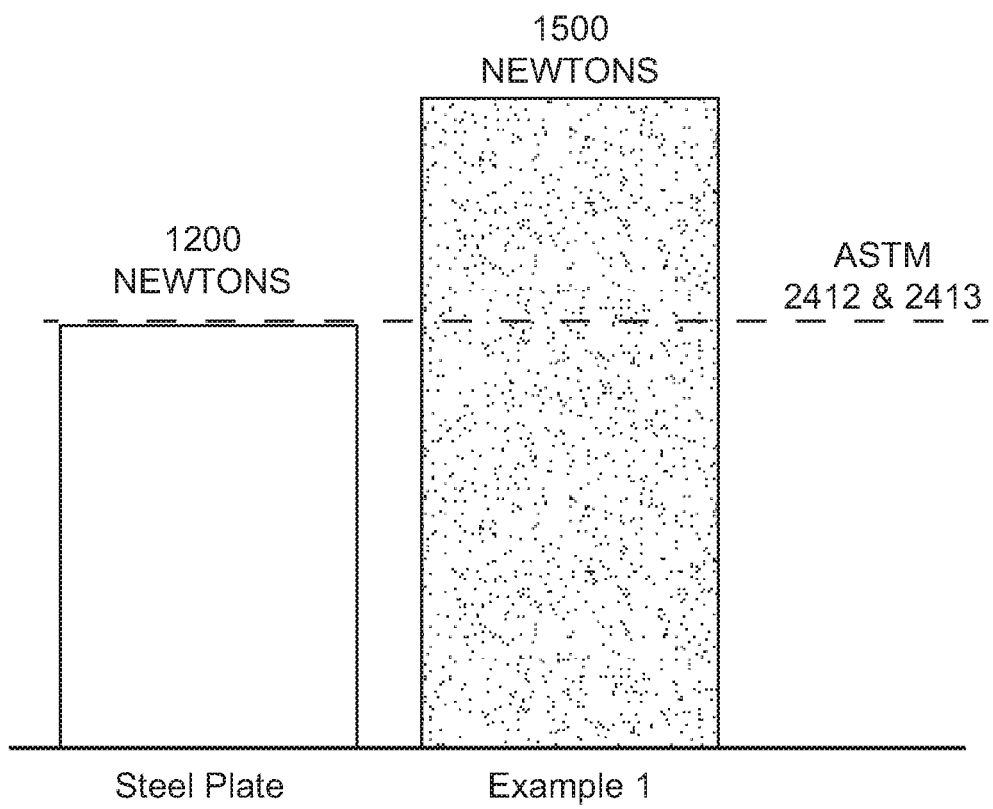

PUNCTURE RESISTANT MATERIAL

This application is a divisional of U.S. patent application Ser. No. 14/940,947 filed on Nov. 13, 2015 which is a continuation of International Application No. PCT/US14/39336, filed May 23, 2014, which claims the benefit of U.S. Provisional Application No. 61/827,326, filed May 23, 2013, all of which are incorporated by reference.

BACKGROUND OF THE INVENTION

Field of the Invention

The invention is directed to a puncture resistant material made from consolidated layers of woven polypropylene fibers and nonwoven thermoplastic fibers. The puncture-resistant material has particular application in the manufacture of shoe soles.

Description of the Related Art

The standard shoe sole protective material is steel, which continues to be the standard against which other shoe sole materials are judged for puncture resistance. However, a steel plate in a shoe lacks flexibility and is uncomfortable to wear. These drawbacks have been addressed to some extent by protective shoe sole materials made from fabric and fabric composites, as described in U.S. Patent Application Publication 2008/0222919, U.S. Pat. Nos. 6,167,639, and 5,896,680, for example. However, the prior art shoe sole materials all lack the desired combination of puncture resistance and flexibility at low weight and thickness. The inventors herein have discovered a technique for making a novel, highly puncture-resistant and flexible material from polypropylene and thermoplastic fibers which has application in the manufacture of puncture-resistant finished products, including but not limited to blast mitigation barriers, gloves, and shoe soles.

SUMMARY OF THE INVENTION

Thus, in one aspect, the invention is a puncture-resistant material, comprising one or more woven layers comprised of tightly woven yarns made from twisted high strength continuous filament polypropylene fibers and having a plurality of thermoplastic batting fibers needlepunched in a perpendicular direction into the woven layer(s) to form a substantially monolithic material. The density of the resulting monolithic material is increased by heat treatment and calendaring.

In another aspect the invention is a method for making a shoe sole material comprising the steps of: twisting high modulus polypropylene fibers to form continuous filament yarns; weaving said continuous filament yarns to form a tightly woven layer; placing batting material of thermoplastic fibers adjacent the woven layer; and needlepunching the batting material in a perpendicular direction into the woven layer to form a consolidated material. The consolidated material is heated above the glass transition temperature of the fibers to thermally shrink the fibers thus increasing the density of the material. The material is then calendared to further increase the density and form a puncture-resistant insole material.

In presently preferred embodiments, the thermoplastic fibers are polypropylene fibers.

In the preferred embodiments, the shoe sole material according to the invention is incorporated into a shoe sole as an insole material, i.e., inside an outer sole layer. In presently preferred embodiments, the insole material is positioned between an outer sole layer and one or more inner layers adjacent the wearer's foot. The preferred material according to the invention passes ASTM Standards 2412 and 2413 for puncture resistance. The protective shoe sole incorporating the material passes ASTM Standards 2412 and 2413 for flexibility.

BRIEF DESCRIPTION OF THE DRAWINGS

FIG. 1 is graphic depicting the performance of a shoe sole material in a puncture resistance test according to the present invention, compared to a steel plate.

DETAILED DESCRIPTION OF THE INVENTION

Standards for protective footwear are described in ASTM F2413, entitled "Standard Specification for Performance Requirements for Protective (Safety) Toe Cap Footwear" and ASTM F2412, entitled "Standard Test Methods for Foot Protection." Among other criteria, these standards set forth puncture resistance and flexibility requirements for a shoe sole material. Reference to a particular ASTM standard herein means the standard in effect on the effective filing date of this application. These standards set forth testing protocols for shoe sole materials generally recognized by those of ordinary skill in the art and are incorporated by reference.

The puncture resistant shoe sole material of the present invention is preferably used inside of an outermost layer of a shoe sole, i.e., as an insole material and is preferably in an intermediate layer, between an outer layer and an inner layer adjacent the wearer's foot.

The woven component of the material is formed from high strength polypropylene fibers.

To form the woven layer, the yarns are first twisted from 1 to 5 turns per inch to allow the material to be woven fairly tightly and act more like a monofilament. As an example, twisting may increase the denier of a polypropylene fiber yarn from 940d to 1150d. However, these results depend greatly on the denier of the starting material.

The yarns are woven to create a woven layer having a fairly tight weave, generally having greater than about 80% cover factor, and preferably greater than about 90% cover factor. A 25×25 plain weave has been found suitable, but is not critical. A 20×20 weave to about 30×30 weave is contemplated. In the embodiment of Example 1, a 24×24 weave is used.

From 1 to 20 woven layers, and preferably 5 to 9 woven layers are positioned with fiber batting material on one or both sides to form a stack. The stack is consolidated by needlepunching so that the batting material is forced into the interstices of the woven layer and forms a generally monolithic material.

The fiber batting material consolidated with the woven layers may be a batt of the same fibers used in the woven layers, or may be different. It is preferred to use high strength thermoplastic fibers, such as, without limitation, certain thermoplastic polyester fibers, polyamide fibers, poly(arylene sulfide) fibers; and high strength polypropylene and polyethylene fibers, all of which are available commercially and well characterized as to strength. Preferably 1-10 oz/yd$^2$ of batting fibers are used. In some instances, 5-8 oz/yd$^2$ has been found to be appropriate.

Heat treatment is conducted to increase the density of the consolidated material. Preferably, heat treatment is conducted to a temperature slightly above the glass transition temperature of the thermoplastic fibers to partially melt the thermoplastic fibers. The thermoplastic fibers are not substantially completely melted to form a matrix, as might be expected forming a fiber composite, but the thermal shrinkage tightens the weave even more and partially melts the through thickness fibers to bond the system together. The density of the material is preferably increased in a range of about 5% to about 20%. In some cases, it is desired to increase the density in a range of about 8 to about 15%. In presently preferred, but non-limiting embodiments, the density is increased about 10 to 12%. In the case of certain polypropylene fibers, the heating step is preferably conducted in a dryer at a temperature in the neighborhood of 320° F.

Calendaring further increases the density of the material and reduces the thickness of the material to about 0.05 to about 0.35 inches, preferably about 0.10 to about 0.20 inches, which is considered suitable for most shoe insole applications. The weight of the insole material is preferably 50-120 oz/yd$^2$, more preferably 65-75 oz/yd$^2$.

The material is incorporated into a protective shoe by cutting the puncture resistant material to form an insole profile covering substantially the inside bottom surface of a shoe to form a puncture-resistant barrier. Preferably, the material is an insole material, intermediate an inner layer and an outer sole layer.

Example 1

Highly drawn and high strength INNEGRA® brand polypropylene continuous filament yarns having a denier of about 940d were twisted fairly aggressively—about 2.5 turns per inch (TPI)—and woven into an approximately 24×24 plain weave. Six of the woven layers were arranged in a stack, and a batt of similar polypropylene fibers was arranged on the top and bottom of the stack and consolidated with the woven layer by needlepunching. The consolidated material was heat set in an oven at 320° F. to shrink the materials significantly. The resulting material was calendared under heat and pressure low enough not to significantly impact the physical properties of the fibers, but sufficient to reduce the thickness and smooth the surface. Before arranging in a shoe insole, the resulting material has a thickness of about 0.170 inches, a weight of about 67.5 oz/yd$^2$ and passes ASTM 2412/13 for puncture resistance. Arranged as an intermediate layer in a shoe sole, the resulting product passes ASTM 2412/13 for flexibility.

FIG. 2 shows the penetration resistance of a material according to Example 1 compared against a standard steel shoe sole material having a thickness selected to pass ASTM 2412/13.

The above description of the preferred embodiments is not to be deemed limiting of the invention, which is defined by the following claims. The foregoing description should provide the artisan of ordinary skill with sufficient information to practice variants of the embodiments described. Features and improvements described in connection with one embodiment or one claim may be combined with other embodiments or other claims without departing from the scope of the invention.

The invention claimed is:

1. A method of making a puncture-resistant fabric, comprising:
    twisting high modulus polypropylene filament yarns;
    weaving said continuous filament yarns to form a tightly woven layer;
    placing a batting material of thermoplastic fibers adjacent said woven layer;
    needlepunching said batting material in a perpendicular direction into the woven layer to form a consolidated material;
    heating said consolidated material above the glass transition temperature of said thermoplastic fibers, partially melting without completely melting the thermoplastic batting fibers, thermally shrinking the fibers and increasing the density of the consolidated material;
    calendaring the consolidated material formed in the heating step to form a puncture-resistant fabric.

2. The method of claim 1, further comprising the step of cutting the puncture resistant fabric to form an insole profile to form a puncture-resistant shoe insole.

3. The method of claim 1, wherein the twisting step comprises aggressively twisting the high strength polypropylene fibers at about 1-5 turns per inch to increase the denier of the continuous filament yarns.

4. The method of claim 1, wherein the weaving step produces a plain weave having greater than about 90% cover factor.

5. The method of claim 1, comprising the step of stacking 1 to 20 individual woven layers to form said woven layer.

6. The method of claim 5, comprising calendaring the heat-treated consolidated material to a thickness of about 0.05 to about 0.35 inches.

7. The method of claim 5, wherein said batting material fibers and said high strength polypropylene fibers are the same polypropylene polymer starting material.

8. The method of claim 1, wherein the batting fibers comprise 1 to 10 oz/yd of polypropylene and nylon batting fibers placed on opposite sides of the woven layer and needlepunched in a perpendicular direction into the interstices of the woven layer to form said consolidated material.

9. The method of claim 1, wherein said heating step is conducted at a temperature to cause partial melting of the consolidated material and increase the density of the material by about 5 to 20% compared to the material prior to heat treatment.

* * * * *